June 5, 1928.  N. BURKHOLDER  1,671,966
BALING PRESS
Original Filed Feb. 16, 1926   2 Sheets-Sheet 1
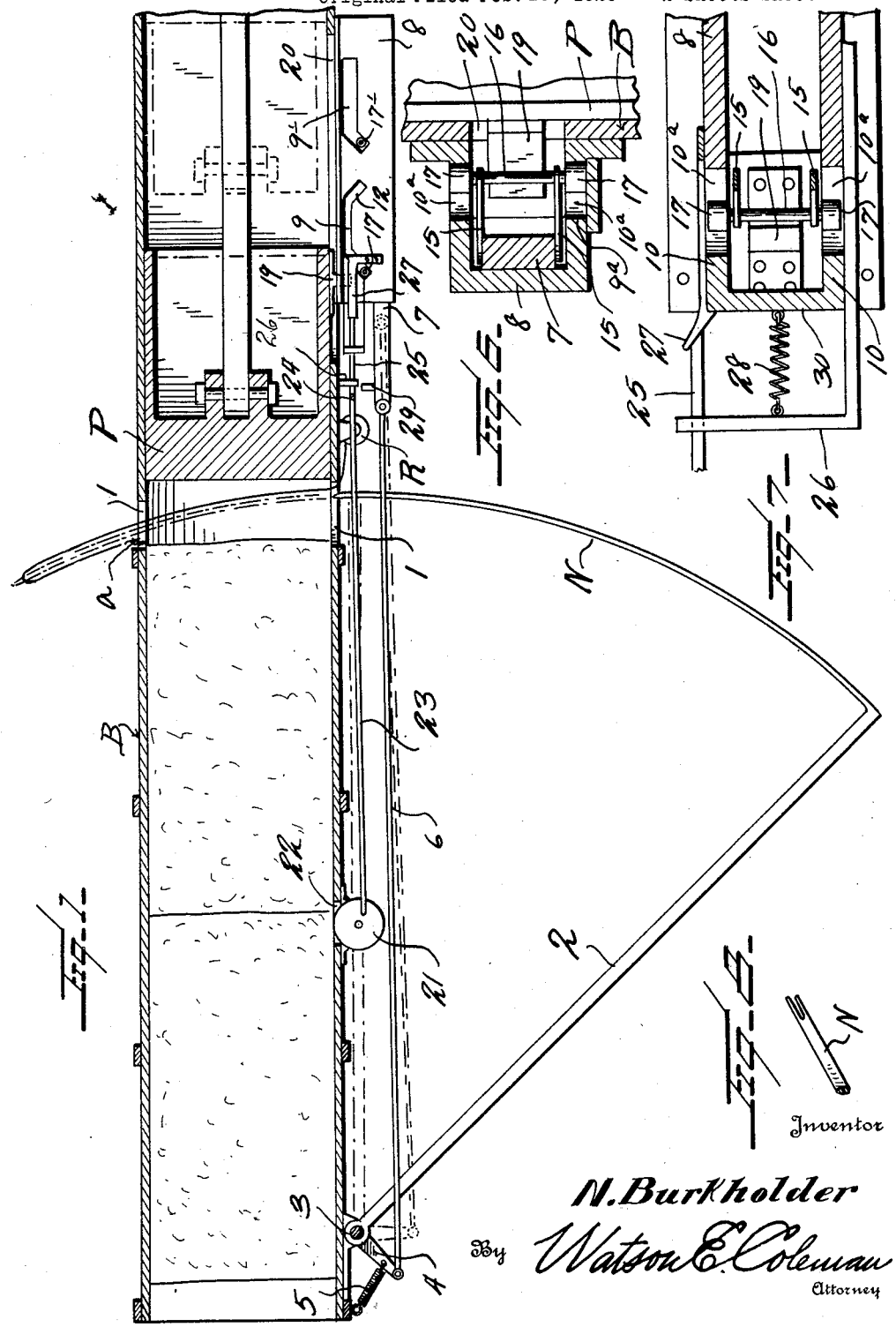

June 5, 1928.
N. BURKHOLDER
BALING PRESS
Original Filed Feb. 16, 1926 2 Sheets-Sheet 2
1,671,966
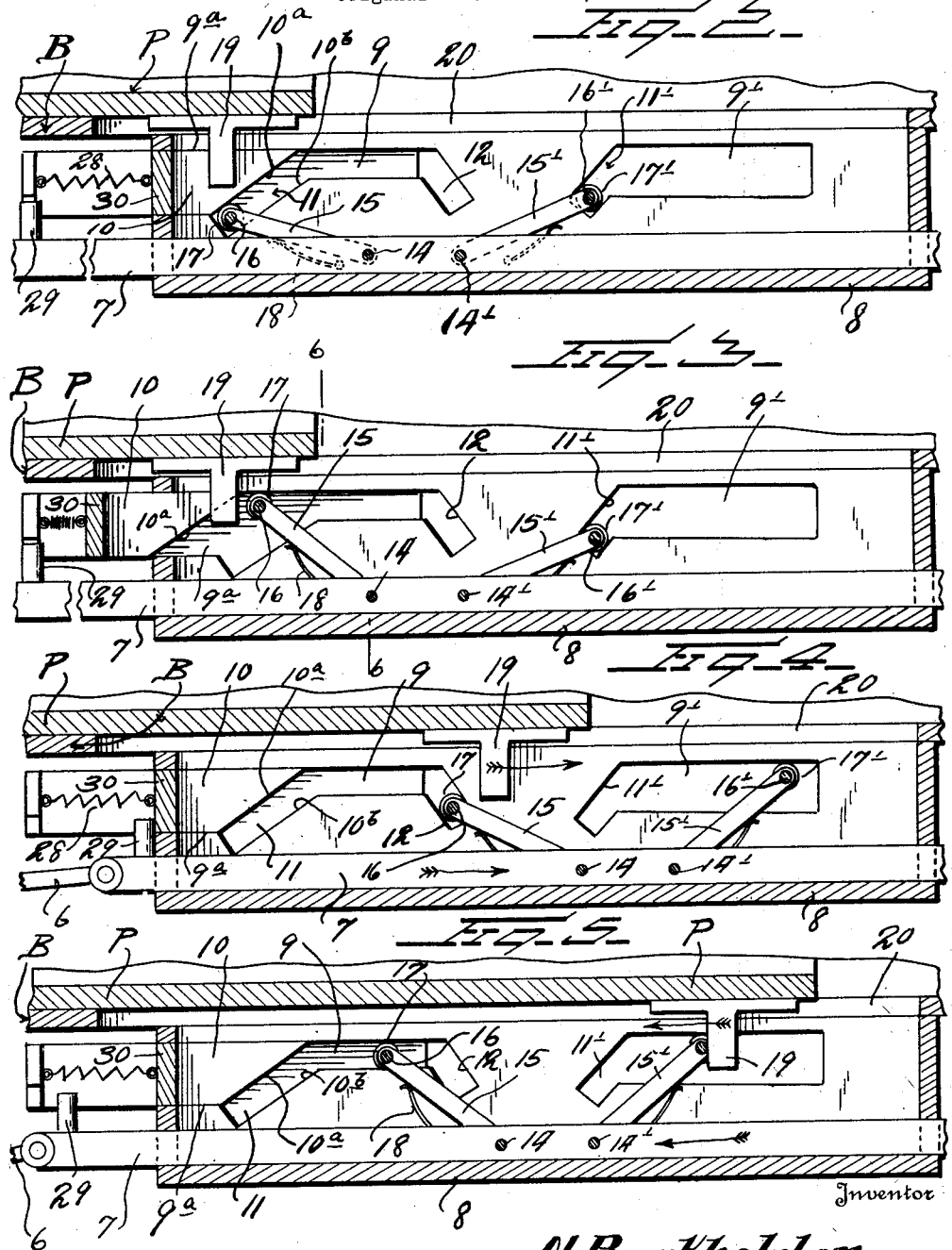
Inventor
N. Burkholder
By Watson E. Coleman
Attorney Patented June 5, 1928.

1,671,966

UNITED STATES PATENT OFFICE.

NOAH BURKHOLDER, OF EPHRATA, PENNSYLVANIA.

BALING PRESS.

Application filed February 16, 1926, Serial No. 88,673. Renewed December 22, 1927.

This invention relates to certain improvements in bale presses and it is an object of the invention to provide a device of this kind with means whereby the baling wire may be properly applied so that the requisite tying of the bale may be effected by a single operator.

Another object of the invention is to provide a device of this general character provided with means operating in an automatic manner for carrying the tie wire across a bale to facilitate the tying operation.

It is also an object of the invention to provide a device of this kind with wire carrying needles movable across the press together with means operating in an automatic manner to effect the requisite movements of the needles.

The invention consists in the details of construction and in the combination and arrangement of the several parts of my improved baling press whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view partly in top plan and partly in longitudinal section taken through a bale having applied thereto a wire mechanism constructed in accordance with an embodiment of my invention;

Figure 2 is an enlarged view partly in section and partly in top plan illustrating certain parts of the automatic structure comprised in my improved device;

Figure 3 is a view similar to Figure 2 showing certain of the parts in a second position;

Figure 4 is a view similar to Figure 2 showing certain of the parts in a third position;

Figure 5 is a view similar to Figure 2 showing certain of the parts in a fourth position;

Figure 6 is a sectional view taken substantially on the line 6—6 of Figure 3;

Figure 7 is a view partly in top plan and partly in section illustrating in detail the mechanism herein employed for releasing the slidable member herein embodied;

Figure 8 is a view in perspective of the outer or free end portion of a needle.

As disclosed in the accompanying drawings, B denotes a baling press of any desired type having a plunger P arranged to reciprocate within the compression chamber, the material to be baled being delivered within the compression chamber in any preferred manner. The side walls of the press B at a point in advance of but closely adjacent to the piston or plunger P when at the limit of its inward or compression stroke are provided with the openings 1 through which a needle N is adapted to pass, said needle being arcuate in form and of a length to extend entirely across the press and a material distance therebeyond. The needle N is carried by an elongated arm 2 herein disclosed as having one end portion fixed to a vertically disposed shaft 3 rotatably supported by a side wall of the press B adjacent to the end thereof remote from the piston P. This shaft 3 is also provided with an outstanding rock arm 4 with which the retractile member or spring 5 is engaged, said member or spring being also attached to the adjacent side wall of the press B and thereby providing means to impart retracting movement to the arm 2 and the needle N carried thereby.

Pivotally engaged with the arm 4 is an end portion of a rod 6, said rod being forwardly directed and operatively connected with an end portion of a slide 7 working within the housing 8 carried by the adjacent wall of the press B. The top and bottom walls of the housing 8 adjacent to the inner ends thereof are each provided with a longitudinally disposed slot 9 opening at the inner end of said wall, the inner portion of the slot being transversely enlarged, as at 9ª, to slidably receive a latch member 10. The inner or inserted end 10ª of the latch member is disposed on a bevel with the opposed edge portion 10ᵇ of the slot 9 in parallelism therewith when the latch is at the limit of its inward movement whereby an outwardly inclined slot extension 11 is provided. The opposite end portion of the slot 9 is continued by an inclined slot extension 12 disposed in a direction opposite to the slot extension 11.

Pivotally connected, as at 14, to the slide 7 a desired point within the housing 8 and positioned above and below said slide are the arms 15 the free end portions of which being connected by rods 16 extending outwardly thereof. Mounted upon the extended portions of the rods 16 are the rollers 17 which ride within the slots 9 and the extension slots 11 and 12 as will hereinafter be more particularly referred to. Each of the arms 15 has bearing thereagainst a spring 18 operating to automatically swing said arm 15 in a direction toward the adjacent side wall of the press B.

The piston P or more particularly the conventional box carried thereby is provided with an outstanding lug or projection 19 extending within the housing 8 through a longitudinally disposed slot or opening 20 in the adjacent wall of the press B and this lug or projection 19 upon reciprocation of the piston P travels in a path intersecting the vertical plane or alignment of the slots 9.

Normally the latch members 10 are at the limit of their inward movement with the rollers 17 positioned in the outer free end portions of the slot extensions 11 whereby the rod 16 is held out of the path of travel of the lug or projection 19.

A disc 21 is rotatably supported by a side wall of the bale press and extends inwardly thereof through a suitable opening 22 and as a bale is being formed said disc is rotated, the circumference of the disc being equal to the length of the bale and said disc 21 is intermittently operated by contact with the bale moving rearwardly within the press under the influence of the piston or plunger P. Operatively engaged with the disc 21 is a forwardly directed rod 23 having its forward end portion operatively connected, as at 24, with the rod 25 slidably disposed through the guide members 26 whereby said rod 25 has reciprocatory movement in a fixed path of travel. About the time a complete bale has been placed under compression, the forward or free end portion of the rod 25 will engage a spring catch 27 which holds the latches 10 in their normal or inserted position, and the continued forward movement of this rod 25 will free the catch 27 from the latches 10 so that said latches may be withdrawn by the retractile member or spring 28 to the position illustrated in Figure 3 whereupon the arms 15 will be swung inwardly to bring the rod 16 in advance of an in the path of travel of the lug or projection 19 so that as the piston P moves outwardly the contact of the lug or projection 19 with the rod 16 will cause the slides 7 to be moved in unison therewith and in a direction to impose pull upon the rock arm 4 with a resultant rotation of the shaft 3 to carry the needle N across the compression chamber in advance of the bale. The slot 9 proper is of a length to effect the desired passage of the needle through the press and at the time this is accomplished, the rollers 17 will ride outwardly of the slot extensions 12, as illustrated in Figure 4, and bring the rod 16 out of the path of travel of the lug or projection 19 so that no hindrance or obstruction will be offered to the full outward stroke of the piston P. When the rod 16 is free of the lug or projection 19, the spring 5 under general conditions will effect the desired withdrawal of the needle N and the return of the rod 16 to the position illustrated in Figure 2. It is to be understood that after the rod 25 has moved to raise the catch 27, said rod will be at the limit of its forward movement and that there will be sufficient continued rotation of the disc 21 to move or retract the rod 25 away from the catch 27 sufficiently to permit the same to readily engage the latches 10 when they are returned to their inserted or normal position. This return movement of the latches is accomplished by an inwardly disposed lug 29 carried by the exterior portion of the slide 7 and which at the proper time during the inward movement of the slide 7 contacts with the latches 10 or more particularly the intermediate connecting member 30 and moves said latches to their normal position. This return of the latches 10 is effected before the retraction of the slide 7.

In the accompanying drawings, I only disclose a single needle N and the associated mechanism therefor but it is to be understood that as many of such needles could be used as the occasions of practice may necessitate.

It is is also to be undertsood that as a bale is being formed, the wire has been suitably disposed across the compression chamber the same being drawn from the reel R and extended a material distance beyond the opposite side of the press B so that as the bale moves inwardly of the chamber, said wire will be suitably disposed around the sides and in one end of the bale and as the needle passes across the press it carries the wire with it as indicated in Figure 1 so that it is only necessary for a single operator to twist the wire as at $a$ and then cut the same. The needle N extends a desired distance beyond the press to provide for the required initial extension of the wire.

In the event the spring 5 is insufficient to retract or return the needle N to its normal or inoperative position, the lug or projection 19 on the compression stroke of the piston or plunger P will come into contact with a rod 16' connecting the arms 15' pivotally connected, as at 14', to the slide 7, said arms 15' being disposed in a direction opposite to that of the arms 15. When the slide is in its extended or normal position, each of the rollers 17' carried by an extended portion of the rod 16' will be received within an inclined extension slot 11' arranged at the forward end portion of the slot 9', it being understood that a slot 9' together with the extension 11' are in both the top and bottom walls of the housing 8. When the slide is moved rearwardly, the rollers 17' together with the rods 16' freely travel along the slots 9', said slots 9' being each of sufficient width to permit ready passage of the lug or projection 19 beyond the rod 16'. However, as the piston or plunger P moves on its forward or compression stroke and the needle has not been properly retracted, the lug or projection 19 will come into contact with the rod 16' and thereby move the slide 7 outwardly the desired extent and return said rod 16' within the extension slot 11'.

From the foregoing description it is thought to be obvious that a baling press constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A device of the character described including a compress chamber, a plunger arranged to reciprocate therein, a wire carrying needle, means for supporting said needle for movement across the compress chamber, a slide supported by a wall of the compress chamber, an operative connection between the slide and the needle for moving the needle across the compress chamber, a housing in which the slide is arranged, an outstanding part carried by the plunger and extending within the housing, a movable member carried by the slide and constantly urged to a position intersecting the path of travel of the outstanding part of the plunger whereby said outstanding part contacts with the member to impart movement to the slide, means for maintaining said member out of the path of travel of said outstanding part, and means operated by a bale moving within the compress chamber to render said last named means inoperative at predetermined intervals.

2. A device of the character described including a compress chamber, a plunger arranged to reciprocate therein, a housing in communication with the chamber, a wire carrying needle, means for supporting said needle for movement across the chamber, a slide working within the housing, an operative connection between the needle and the slide to cause the same to move in unison, movement of the slide in one direction carrying the needle across the chamber and the movement of the slide in the opposite direction retracting the needle, an outstanding part carried by the plunger and extending within the housing, a member supported by the slide for swinging movement, means for urging said member into the path of travel of the outstanding part of the plunger to cause said slide and plunger to move in unison, a wall of the housing being provided with a guide slot, said swinging member having a part extending within said slot, the end portions of the slot having angular extensions to receive such part of the swinging member to move said member outwardly of the path of travel of the outstanding part of the plunger, a wall of said inclined extensions being movable to permit said swinging member to travel in working position with respect to the outstanding part of the plunger, and means operating at predetermined intervals for imparting movement to said movable wall.

3. A device of the character described including a compress chamber, a plunger arranged to reciprocate therein, a housing in communication with the chamber, a wire carrying needle, means for supporting said needle for movement across the chamber, a slide working within the housing, an operative connection between the needle and the slide to cause the same to move in unison, movement of the slide in one direction carrying the needle across the chamber and the movement of the slide in the opposite direction retracting the needle, an outstanding part carried by the plunger and extending within the housing, a member supported by the slide for swinging movement, means urging said member into the path of travel of the outstanding part of the plunger to cause said slide and plunger to move in unison, a wall of the housing being provided with a guide slot, said swinging member having a part extending within said slot, the end portions of the slot having angular extensions to receive such part of the swinging member to move said member outwardly of the path of travel of the outstanding part of the plunger, a wall of said inclined extensions being movable to permit said swinging member to travel in working position with respect to the outstanding part of the plunger, means operating at predetermined intervals for imparting movement to said movable wall, means for normally maintaining said movable wall against movement and releasable by said last named means, and means for returning said wall to its closed position.

4. A device of the character described including a compress chamber, a plunger arranged to reciprocate therein, a housing in communication with the chamber, a wire carrying needle, means for supporting said needle for movement across the chamber, a slide working within the housing, an operative connection between the needle and the slide to cause the same to move in unison, movement of the slide in one direction carrying the needle across the chamber and the movement of the slide in the opposite direction retracting the needle, an outstanding part carried by the plunger and extending within the housing, a member supported by the slide for swinging movement, means urging said member into the path of travel of the outstanding part of the plunger to cause said slide and plunger to move in unison, a wall of the housing being provided with a guide slot, said swinging member having a part extending within said slot, the end portions of the slot having angular extensions to receive such part of the swinging member to move said member outwardly of the path of travel of the outstanding part of the plunger, a wall of said inclined extensions being movable to permit said swinging member to travel in working position with respect to the outstanding part of the plunger, means operating at predetermined intervals for imparting movement to said movable wall, means for normally maintaining said movable wall against movement and releasable by said last named means, and means carried by the slide and engaging said movable wall to return the same to its closed position.

In testimony whereof I hereunto affix my signature.

NOAH BURKHOLDER.